(No Model.)
G. SCHMITTLE.
FLY TRAP.
No. 544,831. Patented Aug. 20, 1895.
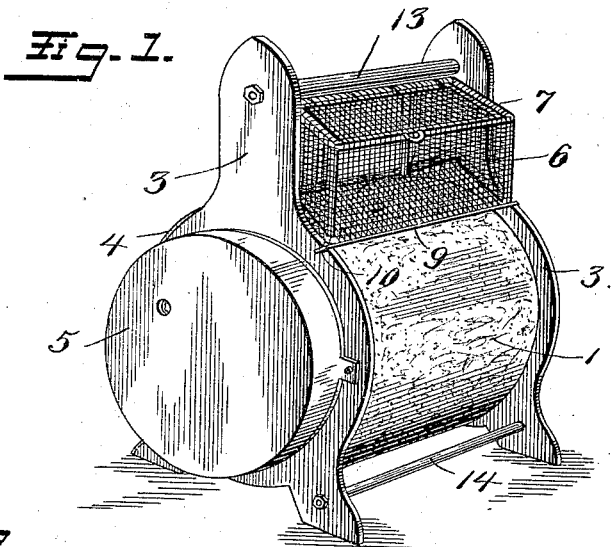
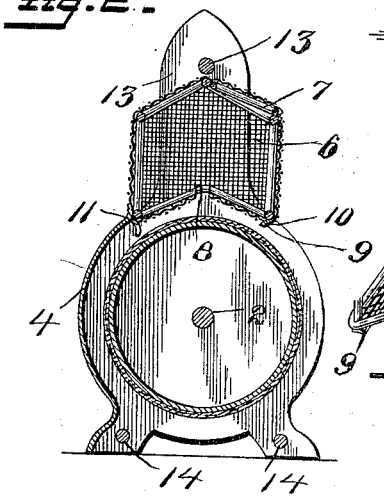
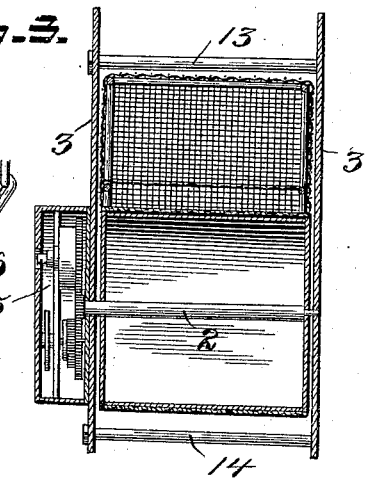
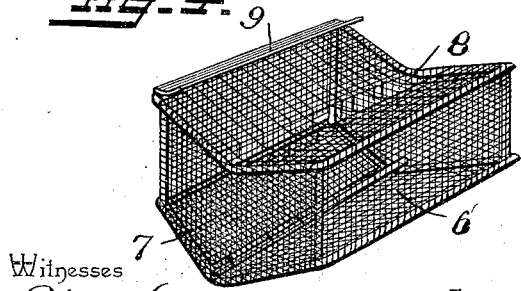
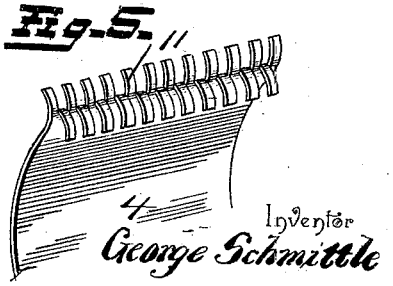
Witnesses
H. J. Koerth
J. H. F. Riley
By his Attorneys,
Inventor
George Schmittle
C. A. Snow & Co.

UNITED STATES PATENT OFFICE.

GEORGE SCHMITTLE, OF PHILIPSBURG, PENNSYLVANIA.

FLY-TRAP.

SPECIFICATION forming part of Letters Patent No. 544,831, dated August 20, 1895.

Application filed June 22, 1895. Serial No. 553,724. (No model.)

*To all whom it may concern:*

Be it known that I, GEORGE SCHMITTLE, a citizen of the United States, residing at Philipsburg, in the county of Centre and State of Pennsylvania, have invented a new and useful Fly-Trap, of which the following is a specification.

The invention relates to improvements in fly-traps.

The object of the present invention is to improve the construction of fly-traps, and to provide a simple and effective one, capable of readily catching flies and adapted to enable the flies captured to be conveniently disposed of.

The invention consists in the construction and novel combination and arrangement of parts hereinafter fully described, illustrated in the accompanying drawings, and pointed out in the claims hereto appended.

In the drawings, Figure 1 is a perspective view of a fly-trap constructed in accordance with this invention. Fig. 2 is a vertical sectional view of the same. Fig. 3 is a similar view taken at right angles to Fig. 2. Fig. 4 is a detail perspective view of the removable cage, showing the bottom thereof. Fig. 5 is a detail perspective view of a portion of the casing, illustrating the construction of the brush which forms a stop for the flies. Fig. 6 is a detail view of the bottom of the cage.

Like numerals of reference indicate corresponding parts in all the figures of the drawings.

1 designates a revolving drum mounted on a shaft 2 and arranged within a frame or casing, which is composed of similar sides or ends 3, and which is open at one side to expose the drum 1, and which has its other side closed at 4. The end pieces 3 have substantially circular central portions of greater diameter than the drum, and the side 4 is constructed of sheet metal and conforms to the configuration of the adjacent edges of the ends 3. The shaft 2 of the drum is connected with actuating mechanism 5, which is preferably a spring-motor of any desired construction, and the actuating mechanism is adapted to impart to the drum a slow, steady rotation to carry flies which alight on the drum forward imperceptibly to bring them beneath a removable cage 6.

The removable cage is located above the drum and is substantially rectangular and is constructed of wire-gauze or similar material, secured to a suitable supporting framework. The top of the cage is provided with a hinged lid 7 and the bottom is composed of two upwardly-inclined portions and is provided at the center or apex with a series of openings 8, forming entrances to the cage. At one side of the bottom of the cage is arranged a flange 9, having its terminals projecting laterally from the cage and arranged detachably in slots 10 of the end of the casing. A sufficient space is provided between the lower edge of the flange 9 and the drum to permit flies to be carried upward beneath the flange to a position beneath the cage. At the opposite side of the cage the casing is provided with a metal brush 11, composed of a series of tongues forming a seat for the cage and extending downward to within a short distance of the drum to prevent the flies from following the drum in its rotation. As soon as the flies arrive at the brush, they are compelled to go back and are stopped by the flange at the other side of the cage, and, finding the openings at the apex of the bottom, enter the cage. After the cage has been filled it may be removed and the flies destroyed and emptied from the cage through the opening at the lid or door of the top.

The ends of the frame or casing are connected by transverse rods or bolts 13 and 14, located at the top and bottom.

In order to attract flies to the surface of the drum, the latter is provided with a covering 15, of fabric or other suitable material, designed to be saturated with sweet liquid, and the trap may be placed on a table or other support and can, if desired, be readily hung close to the ceiling of a room or the like.

The actuating mechanism or motor 5 is preferably located on the outer face of one of the ends of the frame or casing, and as the drum requires to be revolved very slowly and almost imperceptibly the actuating mechanism may be arranged to run for a considerable length of time without necessitating rewinding.

It will be seen that the trap is simple and inexpensive in construction, that the cage forms an intervening space between it and the bottom of the cage at a point directly above the drum, causing flies to enter the cage as soon as their forward movement through the rotation of the drum is checked, and that the cage is readily removable to dispose of the flies that are captured.

Changes in the form, proportion, and the minor details of construction may be resorted to without departing from the principle or sacrificing any of the advantages of this invention.

What I claim is—

1. A fly trap, comprising a frame or casing open at one side, a revolving drum mounted in the frame or casing and exposed at the open side thereof, a removable cage arranged within the plane and located directly above the drum, and provided with a bottom having a raised central portion forming an intervening space between it and the drum and provided with entrance openings, means for rotating the drum, and stops located at opposite sides of the cage, the one at the open side of the frame or casing being separated from the drum a sufficient distance to permit the entrance of flies, substantially as described.

2. A fly trap, comprising a frame or casing open at one side and provided at its ends with similar slots, a brush located at the upper edge of the closed side of the casing and forming a seat, a revolving drum mounted in the frame or casing, and a removable cage located directly above the drum, and provided at its bottom with openings and having one edge supported by the said seat and provided at the opposite side with a depending flange forming projections and fitting in the slots of the frame or casing and supporting the adjacent side of the cage, substantially as described.

In testimony that I claim the foregoing as my own I have hereto affixed my signature in the presence of two witnesses.

GEORGE SCHMITTLE.

Witnesses:
A. B. ANTES,
A. J. MILLER.